United States Patent [19]

Vandergriff

[11] 4,140,503

[45] Feb. 20, 1979

[54] VAPOR CONDENSER AND LINT HUMIDIFIER SYSTEM

[76] Inventor: Arvel L. Vandergriff, 1701 Heffner Ave., Corcoran, Calif. 93212

[21] Appl. No.: 870,862

[22] Filed: Jan. 19, 1978

[51] Int. Cl.² ............................................. B01D 46/36
[52] U.S. Cl. ...................... 55/290; 19/66 R; 55/227; 55/295; 55/302; 55/431; 55/466
[58] Field of Search ............... 55/227, 270, 290, 291, 55/295, 302, 354, 424, 431, 466; 19/66 R, 66 CC, 89, 202; 261/115–117, 129, 130

[56] References Cited

U.S. PATENT DOCUMENTS

| 1,460,519 | 7/1923 | Wadsworth | 19/66 R |
|---|---|---|---|
| 2,700,188 | 1/1955 | Buresh et al. | 19/89 X |
| 2,834,058 | 5/1958 | Bryant | 19/66 CC X |
| 3,014,247 | 12/1961 | Salmon | 19/202 |
| 3,029,478 | 4/1962 | Vandergriff | 19/202 |
| 3,525,198 | 8/1970 | Neitzel | 55/290 X |
| 3,628,313 | 12/1971 | Broadbent | 55/290 X |
| 3,854,170 | 12/1974 | Caughlin | 19/202 |
| 3,881,222 | 5/1975 | Roberson | 19/66 R |
| 4,031,593 | 6/1977 | Vandergriff | 19/66 CC X |

Primary Examiner—Richard L. Chiesa
Attorney, Agent, or Firm—Mason, Fenwick & Lawrence

[57] ABSTRACT

A cotton condenser for receiving air borne lint cotton or similar material from an air stream and forming a bat therefrom on a screen drum for delivery to a packaging press, wherein the condenser housing forms a chamber outwardly surrounding the screen drum maintained at subatmospheric pressure for receiving the air borne lint where the lint forms the bat on the screen. A doffing roller system withdraws the cotton bat from the screen and passes it to a lint slide and packaging press through a further set of doffing rollers which act as a seal against the pressure difference between the interior and exterior of the condenser where the bat exits from the condenser. Means are provided to monitor the moisture level of the cotton bat being delivered by the condenser and activate a humidifying system to supply air of controlled humidity to the condenser chamber and through the bat on the screen to raise the lint moisture to a desired level.

35 Claims, 17 Drawing Figures

VAPOR CONDENSER AND LINT HUMIDIFIER SYSTEM

BACKGROUND AND OBJECTS OF THE INVENTION

The present invention relates in general to lint condensers and the like for separating cotton or other fibrous materials from a stream of air, such as lint condensers in current use in the cotton industry which are adapted to collect and remove lint, fibers and like material from an air current by the use of a moving foraminous screen upon which the lint or fiber is deposited by the air current. More particularly, the invention relates to lint condensers and the like in which subatmospheric pressure conditions are maintained in the condenser housing in the zone immediately outwardly surrounding the surface of the condenser drum or rotating screen and wherein means are provided for humidifying the lint in the condenser so that the lint discharged to the bale press is automatically maintained at a desired range of moisture content.

It is very common practice to convey lint cotton from a plurality of gin stands, where the lint is separated from the seeds, by means of a current of air through a lint flue to a condenser, frequently referred to as a battery condenser, serving a number of such gin stands, where the lint or fiber which is air conveyed into the condenser housing or casing is deposited on a screen mounted in the housing and forms a bat which is doffed from the screen and discharged through a lint slide to the baling press. A typical condenser comprises a rotary screen drum mounted in the condenser housing into which the fiber laden current of air is conducted, the arrangement being such that the current is directed through the peripheral screen surface of the drum and is discharged axially through one or both of the ends of the drum through an opening or openings in the side of the housing. During such travel, the lint or fiber is deposited on the screen surface and is carried by the rotary motion of the drum into the range of operation of a pair of doffing rolls which strip the fiber from the drum and discharge it from the apparatus, usually down a lint slide. It is customary to locate curved sealing strips or flashing at each side or head of the condenser housing adjacent the ends of the rotating screen drum extending in a circular path concentric with the drum axis and conforming closely to the shape of the ends of the screen drum to contact the rotating drum surface and form a seal between the rotating drum and the heads of the condenser housing.

Prior to the development of lint cleaning in gin installations, the condenser serving the gin stands received the lint and conveying air under a slightly positive pressure generated by the mechanism used to doff the lint from the gin saws in the gin stands. This operation of the condenser under slightly positive pressure or superatmospheric pressure permitted the use of large doffing rollers which allowed some air to leak between the rollers, helping to thread the lint bat between the rollers. The introduction of lint cleaners between the gin stands and condenser made it necessary to place the condensing chamber under vacuum or subatmospheric pressure in order to convey the lint from the lint cleaner to the condenser. The amount of vacuum or subatmospheric pressure needed varied with the type of lint cleaning being used. The pressure difference inside and outside the condensing chamber presented problems in getting the lint bat to thread between the doffing rollers.

It will be appreciated that the introduction of high vacuum cleaners introduced considerable problems, particularly in regard to arranging the doffing rollers so that they would both seal against the high vacuum and deliver a lint bat to the atmospheric pressure conditions existing in the lint slide which received the bat from the doffing rollers of the condenser. While attempts have been made to provide doffing rollers which are arranged to float, so that they may move away from the screen and away from a companion fixed roller as the bat thickness varies, to attempt to obtain the desired seal between the doffing rollers against the high vacuum, considerable complications have been introduced by providing appropriate drive for such a floating doffing roller. As the handling capacity of battery condensers has increased from about 10 bales per hour in the early 1950's to 30 to 40 bales per hour at the present time, the speed of the condenser screen drum and the doffing rollers have been increased in proportion, resulting in more problems with gear wear and damage to the screen surface in case of chokes.

A further complication has resulted from use of small diameter rollers having to run close to the screen drum, because sealing of the joint between the screen drum and the heads of the condenser formed by the sides of the condenser casing adjacent the doffing rollers becomes difficult, as the old customary methods of sealing could not be used in this construction and alternate methods have been troublesome. If one attempts to seal the space between the rotating screen drum and head or side wall of the condenser casing by the usual flashing fixed to the head of the condenser and contacting the rotating drum surface, the contact between the rotating drum surface and the flashing results in lint fibers being picked up by the pinch point, and too often the fibers grow into a troublesome wad as the drum rotates. I propose to eliminate flashing between the condenser drum and the condenser head while still providing an effective seal against loss of lint through the space between the condenser drum and the condenser head by forming an air chamber between the end of the condenser head by forming an air chamber between the end of the condenser drum and the head of the condenser which permits air to flow from outside the condenser through the space between the end of the drum and the condenser head as a result of the high vacuum inside the condensing chamber, so that the air flow thus produced effectively seals the space against loss of lint through the space.

Due to a number of recent developments, it has become highly desirable to be able to control the moisture of the lint as it is packaged in the baling presses to which the lint is delivered from the condenser. Textile mills prefer cotton to have a moisture level in the range of about 7% to 8% in order for the cotton to be at an optimum condition for processing at the textile mill. The old custom of using jute bale coverings permitted the lint in the bale to come to equilibrium at such moisture levels in a humidified warehouse or in ambient conditions at the mill warehouse. However, the search for better packages for cotton has led to the frequent use in recent years of sealed polyethylene bags. This has made it highly desirable to control the moisture of the lint as it is being packaged at the gin house because cotton in such sealed packages will not have a chance to regain moisture in the warehouse at the textile mill site.

It therefore becomes extremely important that the moisture content of the cotton as it is discharged from the condenser into the baling press for packaging be at the desired moisture level for mill processing, since the cotton will not have a chance to regain moisture by storage under ambient conditions which will bring it to the desired level.

It will be understood that it is not uncommon for the lint to reach the condenser with only about 5% moisture and it may be as low as about 4% moisture. This is due to the fact that the seed cotton conditioning process, which is necessary to efficiently extract foreign matter, brings the lint moisture down below 6%. Under ambient conditions existing in much of the cotton belt, the humidity is low enough to permit further removal of moisture from the lint as it is conveyed by ambient air to the condenser. Thus it becomes desirable to add about 3% moisture to the cotton at the condenser, if the cotton reaches the condenser with only about 5% moisture, in order to insure that the moisture content be near the optimum level of about 8% when the cotton is packaged, so that it will have the optimum moisture level for processing at the textile mill. Further, by adding 3% moisture to the cotton, the weight of a 500 pound bale would be increased to about 515 pounds, which would add $8.00 to $10.00 to value of the bale at current prices. Such addition of moisture, with consequent increase in bale price, is highly acceptable in the trade because of the preference of the textile mills for the higher moisture cotton in the processing line at the textile mill.

Another significant factor in favor of the higher moisture is the reduced compression load on the baling press. Modern gins produce a universal density bale with the density of about 28 pounds per cubic foot. This requires a press capable of up to 700 tons of compression capacity with low moisture lint, while with the 7% to 8% moisture level, the load may be reduced by as much as ⅓.

An object of the present invention, therefore, is the provision of a novel condenser for receiving air borne lint such as cotton or other fibrous material from an air stream and forming a bat therefrom for delivery to a packaging press, wherein the condenser chamber outwardly surrounding the rotating screen drum is at subatmospheric pressure and means are provided to monitor the moisture level of the cotton bat being delivered by the condenser and supply air of controlled high humidity to the condenser chamber to raise the lint moisture to a desired level of about 8% moisture.

Another object of the present invention is the provision of a condenser for lint cotton or the like as described in the preceding paragraph, wherein the high humidity air is passed through the bat and through the screen drum ahead of the doffing rollers to raise the moisture level of the cotton to the desired level.

Another object of the present invention is the provision of a novel condenser for lint cotton or the like as described in either of the two immediately preceding paragraphs, wherein a doffing arrangement is provided to wipe the condenser screen in order to maintain the condenser screen free of moisture condensate which may cause lint to stick to the condenser, and wherein a further set of doffing rollers are provided to receive the formed bat from the screen doffing rollers and act as a seal against the pressure difference between the subatmospheric pressure in the condenser chamber and the atmospheric pressure externally of the condenser.

Another object of the present invention is the provision of a novel condenser for lint cotton and the like wherein the condenser chamber outwardly surrounding the screen drum is at subatmospheric pressure and wherein air nozzle means are provided adjacent the end of the screen drum providing a circular air jet causing air flow adjacent the opening between the end of the rotating drum and the head plate or side wall of the condenser which will prevent any fibers from passing through this opening and thereby provide an effective seal without use of flashing which seats against either the rotating drum or the head plate of the condenser casing.

Other objects, advantages and capabilities of the present invention will become apparent from the following detailed description, taken in conjunction with the accompanying drawings illustrating preferred embodiments of the invention.

DETAILED DESCRIPTION OF PREFERRED EMBODIMENT

Figures 1, 2:
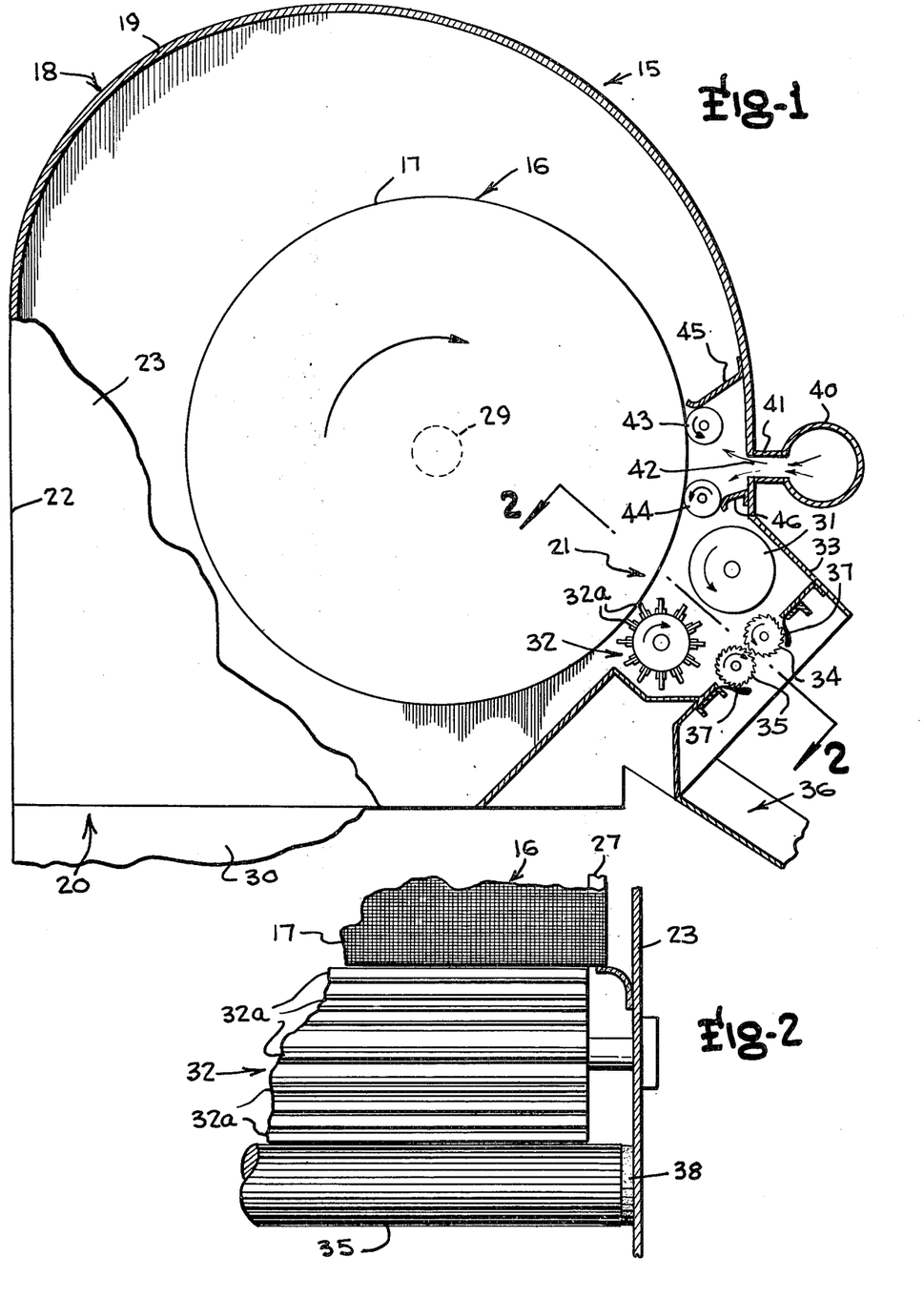
FIG. 1 is a longitudinal vertical section view of a vacuum type condenser, viewed from a section plane transverse to the axis of rotation of the condenser drum, constructed in accordance with the present invention.
FIG. 2 is a partial vertical transverse section view of the condenser, taken along the line 2—2 of FIG. 1.
Figure 3:
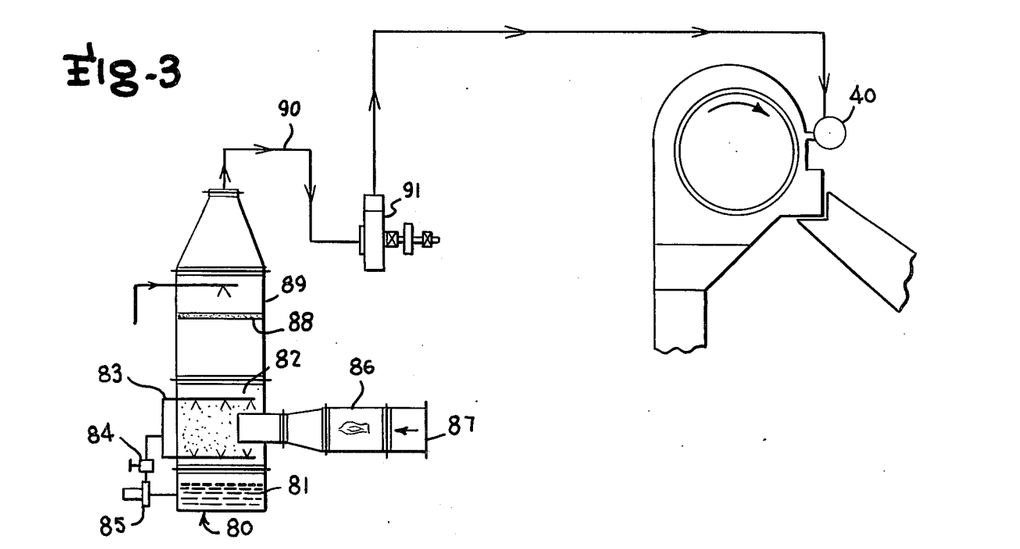
FIG. 3 is a diagrammatic view of the condenser, with parts shown in section, shown in association with a high humidity air supply and control system for the condenser.
Figure 4:
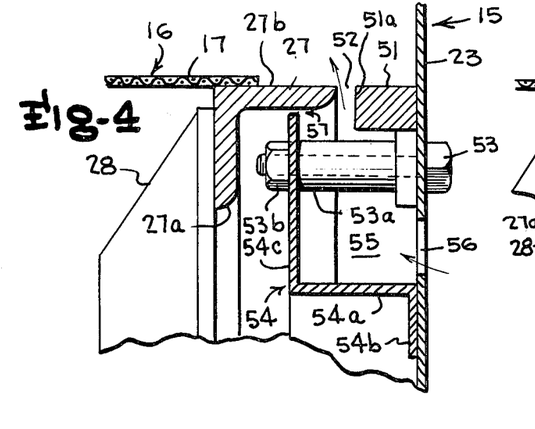
FIGS. 4–8 and 4A–8A are fragmentary section views through a condenser housing head or side wall and adjacent portions of the condenser drum, showing several variations of the arrangement for providing an air seal against the inlet between the end of the condenser drum and the condenser housing head.
Figure 4A:
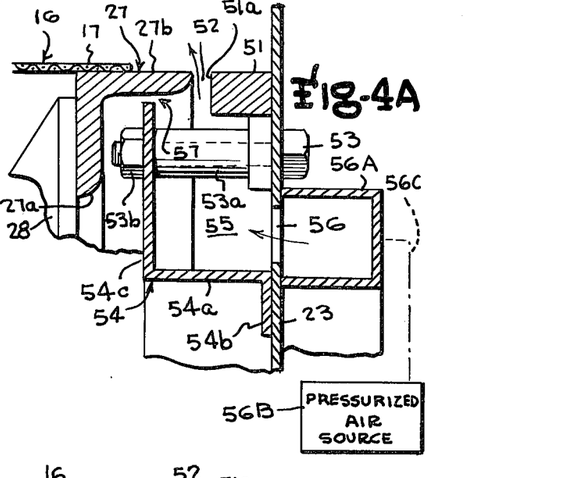

Referring to the drawings, wherein like reference characters designate corresponding parts throughout the several figures, and referring particularly to the form of the invention illustrated in FIGS. 1 to 3 inclusive, there is shown a vacuum type or subatmospheric pressure type vapor condenser embodying the present invention, indicated as a whole by the reference numeral 15, which comprises a rotatable cylindrical condenser drum 16 which may be of conventional construction open at its ends with the peripheral face of the drum being a perforated condenser screen 17 of the usual material employed for condenser screens. A housing or hood 18 encloses the condenser drum 16, and is of generally conventional shape and construction, for the most part, having a curved scroll sheet 19 forming the front, top and rear casing walls extending in an upwardly arching curved path about the condenser drum from a downwardly opening mouth or inlet and portion 20 around approximately ⅞th of the condenser drum circumference to a doffing zone 21. The upwardly arching scroll shaped portion 19 merges into a vertical front wall portion 22 adjacent the inlet end or mouth 20 and extends between two condenser housing end heads or side walls 23, 24, one of which has a center opening 25 to which an air discharge duct 26 is joined connected to a blower or fan (not shown) which provides the negative pressure conditions within the condenser housing. The condenser drum may, in accordance with conventional construction techniques, be formed of a pair of opposite circular end rings or cylinder head members 27, which are typically of angle iron cross-sectional configuration, as illustrated in FIG. 4, supported by radial spoke members 28 extending from a driven center shaft 29 journaled in bearings at the opposite sides of the condenser housing with a suitable drive train coupled to the shaft 29 externally of the side of the condenser housing opposite the side through which the air discharge duct extends. The screen material forming the screen surface or reticulated surface of the condenser, indicated at 17, extends between the two circular end ring members 27 to span substantially the full width of the condenser housing.

The condenser housing enclosing the condenser drum extends downwardly therefrom to join the discharge end of a lint flue, indicated at 30, for example, extending from a lint cleaner or cleaners serving a battery of gin stands, so that the full axial length of the condenser screen is exposed through an arc of almost 180° to the accumulation of lint thereon borne by the flow of air from the lint cleaners through the lint flue to the condenser. This lint conveying air discharges through the screen of the condenser drum, thus separating the air from the lint which remains on the screen. The air discharge duct 26 being vented to ambient atmospheric pressure through the blower or fan at the discharge end of the duct 26 places the exhaust air zone in the drum interior and the lint receiving chamber or zone of the condenser outwardly surrounding the condenser drum at negative pressure or subatmospheric pressure for conveying the lint to the condenser from the lint cleaners.

The condenser drum 16 rotates in a clockwise direction as viewed in FIG. 1, the screen 17 in its lower arc of rotation moving from right to left, and the lint progressively accumulates upon the condenser screen as it traverses the inlet zone or mouth portion 20 at the exit end of the lint flue. This accumulation constitutes the insipient bat, which is continuously formed and usually acquires a thickness of about 3 to 4 inches along the area of exposure to the lint flue before passing under rollers at the doffing zone. The bat thus formed on the condenser screen 17 is then carried around to the doffing zone 21, where a plain doffing roller 31 and a companion flighted doffing roller 32 are located in the lint receiving zone and driven to rotate in the directions indicated by the arrows shown thereon. The flights or vanes of the roller 32 engage the bat and wipe it from the condenser drum and deliver it between the rollers 31 and 32 to pass between the pair of fluted sealing rollers 34, 35 for discharge gravitationally down the lint slide to the baling press. The doffing rollers 31 and 32 and sealing rollers 34, 35 are located in a doffing chamber extension 33, formed as an externally sealed extension of the negative pressure conditioned condenser chamber. The fluted sealing rollers 34 and 35 are sealed, for example by flexible rubberlike flashing strips 37, the circular end seal discs 38 are also provided on the ends of the sealing rollers to seal against air inflow between the ends of the sealing rollers and the condenser side wall.

In the illustrated embodiment, the doffing roller 31 may be a plain roller, while the flighted roller 32 includes a plurality of radially outwardly projecting flexible wiper vanes 32a whose edges extend into wiping contact with the condenser screen. As will be hereinafter described, this condenser is designed to receive moist air in controlled quantities to raise the moisture level of the cotton to the 7% to 8% range as the cotton bat is formed on the condenser screen and transported to the doffing zone. While under most circumstances, the control of the dew point is such that little or no condensation occurs on the metal surfaces of the condenser drum, means must be provided to prevent blinding of the condenser screen if any moisture condensate does form on the screen and causes the lint to stick to it. Problems with this are avoided in the present condenser structure, by providing the flighted doffing roller 32 having the flexible vanes 32a which wipe the screen to remove the lint from the screen under all conditions without damaging pressure against the screen, the bat doffed from the screen being passed between the flighted doffing roller 32 and doffing roller 31 to the fluted sealing rollers 34, 35 which receive the formed bat from the doffing rollers 31, 32 and, acting as a seal remote from the screen surface, against the pressure differential between the ambient atmospheric pressure and the subatmospheric pressure within the condenser, discharge the bat onto the lint slide 36.

In order to raise the moisture level of the lint being doffed from the condenser drum by the doffing roller 32 and passed to the lint slide between the sealing rollers 34, 35 to the desired moisture level, means are provided to supply moist air or humid air to the condenser chamber formed by the condenser housing outwardly of the screen drum, preferably in the region immediately upstream from the doffing rollers, with the humid air or moist air supplied to the condenser having sufficient water vapor which, when transferred to the lint, will raise the lint to the desired moisture level of about 7% to 8%. In the illustrated embodiment, the moist air or humid air from an automatically controlled source of high humidity air to be later described is supplied to a moist air inlet manifold 40 which spans substantially the whole width of the condenser housing and has a lateral outlet or discharge duct 41 extending to the scroll sheet 19 of the condenser housing to discharge the moist air into the condenser chamber zone outwardly surrounding the drum through a discharge slot 42 in the scroll sheet in the region spaced slightly above the doffing rollers. If this high humidity moist air entered in a direction substantially perpendicular to and directed against the screen surface of the drum without providing special means to preserve the form of the bat against the screen, the velocity of the humid air would upset the bat, blowing it off the screen and causing it to come through the doffing rollers in wads. Also, if the humid air is simply redirected to enter more nearly tangent to the surface of the lint bat, a significant amount of conveying air is drawn into the humid air stream resulting in blending which reduces the humidity and thus the potential moisture regain.

To avoid these problems, I have provided in the illustrated embodiment two additional rollers 43 and 44 located above the doffing rollers 32 and 33 and positioned respectively slightly above and slightly below the humid air discharge slot 42 through which the humid air enters the condenser chamber, with flashing or similar flexible sealing strips 45 and 46 extending from the scroll sheet 19 to bear against the surface of the rollers 43 and 44 as shown. The rollers 43 and 44 are supported in bearings for movement toward and away from the adjacent surface of the condenser drum and urged toward the condenser drum under light spring pressure to float against the bat and have the effect of minimizing the problem of blending with the humid air the ambient air in the condenser by which the lint was conveyed to the condenser through the lint flue. It will be seen from the arrows indicating the flow of hot moist air from the moist air inlet 40 in FIG. 1 that the hot moist air is forced through the lint bat from the discharge duct 41 and slot 42 to pass directly into the interior of the drum and be withdrawn through the air discharge duct 26, while disturbance of the bat is minimized due to it having been lightly pressed against the screen by the rollers 43, 44 which float against the bat under their light spring tension, while the rollers 43 and 44 together with their associated sealing strips tend to isolate the zone between the rollers 43 and 44 from the ambient conveying air by which the lint was conveyed to the condenser and avoid the intermingling or blending problem.

Normal methods of flashing which have been used heretofore to prevent air flow and lint loss from the lint zone outwardly surrounding the drum through the spaces between the opposite ends of the condenser drum and the opposite end heads of the condenser housing and thence through the air exhaust duct 26 and the blower or fan, are of the kind generally referred to as flexible flashing seals and are basically of two types. Either the flexible flashing is attached to the head or side wall of the condenser casing and extends across the space between that condenser head and the adjacent end of the condenser drum to bear against the periphery of the condenser drum near that end of the drum, or the flashing is attached to the rotating condenser drum adjacent the associated end of the drum and extends across the space between that end of the drum and the adjacent condenser head to press against the condenser head. While such a seal is reasonably effective to prevent air loss through the space sealed by the flexible flashing, it has been found that when lint fibers are present, it has not been possible to prevent small tufts of fiber from being trapped under the edge of the flashing. As the drum rotates, the tuft rolls and picks up additional fibers, and occasionally these tufts build up large enough to tear the flashing loose, or stop the rotation of the drum.

I propose to eliminate the flexible flashing seal between the ends of the condenser drum and the adjacent condenser head plates while still providing an effective seal against loss of lint through the space between the condenser drum ends and the condenser heads by providing air inlet slots or spaces which will form air jets adjacent the opposite ends of the cylindrical surface of the rotating screen drum. These slots are supplied with air by flow from outside the condenser through the annular zone at the opposite ends of the cylindrical drum surface as a result of the high vacuum inside the lint receiving zone or condensing chamber, or where the subatmospheric pressure in said zone or chamber is not low enough to produce adequate air flow, the necessary air may be supplied to the slots from a pressurized air source, so that the air flow thus produced effectively provides a pneumatic barrier resisting flow of lint through this space and seals the space against loss of lint. The provision of suitable air inlet holes or openings in the head plate or side wall of the condenser at appropriate locations relative to the ends of the rotating screen drum and the formation of a substantially circular or ring-like air nozzle which extends in a circular path adjacent each end of the cylindrical drum surface located so as to direct an air jet from the circular air nozzle in directions to prevent fibers from reaching the opening between the adjacent end of the rotating drum and the head of the condenser provides an appropriate and effective seal without requiring contact between any flashing member and a member against which the free end portion of flexible flashing seats which caused the troublesome wad formation problems in the flexible flashing type seals.

One form of air jet barrier for preventing loss of lint through the spaces at the opposite ends of the condenser drum in a typical existing condenser construction is illustrated in FIG. 4, showing a fragmentary section view, to enlarged scale, through an end portion of the condenser drum and the adjacent condenser end head. FIG. 4 illustrates an end portion of a typical condenser drum 16 having a condensing screen 17 formed in a cylindrical path and fixed at its opposite ends to the circular end rings or cylinder head members 27 supported by the radial spoke members 28 extending from the driven center shaft. The circular end ring 27 shown in FIG. 4, which is like the circular end ring at the opposite end of the drum, is of angle iron cross section having a vertical flange 27a which is welded to the radial spoke members 28 and an outwardly projecting flange 27b extending at right angles to the flange 27a and forming an axial flange concentric with the axis of rotation of the drum projecting toward the adjacent condenser end head 23. Typically, such a condenser would have included a flexible flashing strip fixed to the condenser end head 23, in a circular path lying immediately outwardly of the cylindrical path of the condensing screen 17 and have downwardly and inwardly curving cross-sectional configuration in the region illustrated in FIG. 4 to dispose its free end in sliding contact with the outwardly projecting annular flange portion 27b of the drum end ring, if such flashing were employed. The construction illustrated in FIG. 4 includes an annular stationary ring 51 fixed to the condenser end head 23 in a circular path disposing its radially outwardly facing surface substantially in the extended cylindrical path of the outer surface of the axial flange member 27b of the drum end ring 37 and the condensing screen 17, with the inner end 51a of the stationary ring 51 spaced close to the outer end of the horizontal flange portion 27b of the drum end ring but leaving a narrow slot 52 between the end of the stationary ring 51 and the end of the end ring flange portion 27b and spaced inwardly from the head 23. A plurality of circumferentially spaced fastening lugs 53 are fixed to the condenser end head 23 in a circular path, for example, spaced about 30° apart, and spaced radially inwardly a slight distance from the cylindrical path of the stationary ring 51 and end ring flange portion 27b, to support a circular inlet air chamber wall 54 defining an atmospheric air inlet chamber 55, here shown to be of substantially rectangular cross-sectional configuration, located immediately adjacent and radially inwardly of the slot 52 between the drum end and flange member 52b and the stationary ring 51, extending in a circular path just inwardly of the drum periphery. The atmospheric air chamber wall 54 may be formed of flashing strip material, sheet metal, or similar material, and is here shown to be bent to a configuration providing a cylindrical bottom wall 54a having an outer lip or flange 54b fixed to the condenser end head 23 and having a vertical side wall 54c spaced inwardly from the drum head 23 and having its free edge disposed closely adjacent to and just inwardly of the outwardly extending flange portion 27b of the end ring 27 defining an air flow slot 57 therebetween. The vertical side wall 54c in one embodiment may be provided with a hole or slot for the threaded bolt portions of each of the fastening lugs 53, which are closed against air loss by the spacer 53a surrounding the shank of each fastening lug bolt, and by the nut portion 53b, permitting a slight amount of radial adjustment of the position of the circular vertical side wall portion 54c of the air chamber wall 54 to adjust the size of the slot 57 to the desired dimension. Air inlet holes or openings 56 are provided in the condenser end head 23 of sufficient size and at a sufficient number of circumferentially spaced locations about the path of the air chamber 55 to maintain the interior of the air chamber 55 at atmospheric pressure. It will be apparent that with this construction, atmospheric air is permitted to flow through the air inlet openings 56 into the air chamber 55 to maintain the air chamber at atmospheric pressure, and because of the subatmospheric or vacuum pressure conditions maintained inside the condenser housing in the lint receiving zone outwardly surrounding the condenser drum, air will flow from the atmospheric air chamber 55 outwardly through the slot 52 into the subatmospheric pressure lint receiving zone of the condenser, which air flow presents a barrier to lint loss through the slot 52. An adjustable amount of air flow may also occur from the atmospheric air chamber 55 inwardly through the slot 57 between the chamber wall portion 54c and the end ring flange 27b, but the major air flow from the atmospheric air chamber 55 will be outwardly through the slot 52 in a direction to prevent loss of lint through the space between the rotating ends of the condenser drum and the stationary condenser end heads.

Figure 5:
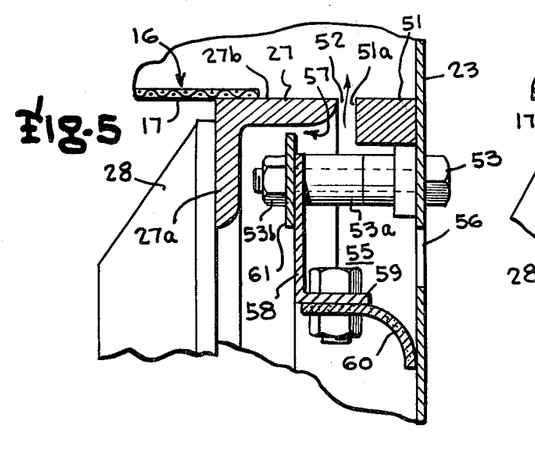
Figure 5A:
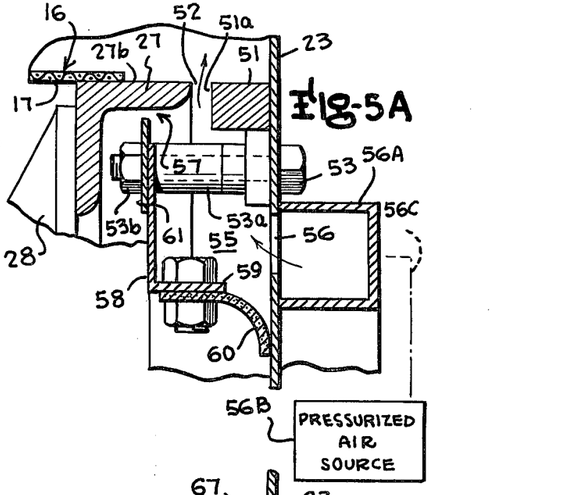

An alternate construction for providing air jet barrier means for preventing lint loss in condensers of the type having a stationary ring 51 on the condenser end head near a confronting condenser drum end ring 27 is illustrated in FIG. 5, wherein the atmospheric air chamber 55 is formed by an annular vertical side wall 58 of sheet material, such as sheet metal similar to the material of the condenser end head 23, carried by the bolt portion of the fastening lugs 53 and spaced inwardly from and parallel to the condenser end head 23 by the spacer 53a surrounding the fastening lug bolt portion, the side wall 58 having a lip or flange formation 59 extending therefrom toward the condenser end head 23 near the radially inner edge of the wall 58 to which a fixed circular flashing strip 60 is mounted by fasteners and bears tightly against the inner surface of the condenser end head 23 to form the bottom wall portion of the chamber 55. An additional circular flashing strip 61 is mounted on the fastening lugs 53, by providing slightly oversized bolt openings or radially elongated holes therein for the bolt portions of the lugs 53, so that the flashing strip 61 can be mounted tightly against the side wall member 58 by the nut portions 53b of the fastening lugs and adjusted to space the edge of the flashing strip 61 near the flange portion 27b of the condenser end ring 27 to provide the slot 57 of appropriate width. Atmospheric air pressure is maintained within the air chamber 55 in the FIG. 5 arrangement by communication of the chamber with ambient air through the air inlet openings 56, and an air jet or air outflow barrier is thus formed through the slot 52 into the subatmospheric pressure zone of the condenser outwardly surrounding the condenser screen in the same manner as in the FIG. 4 embodiment.

Figure 6:
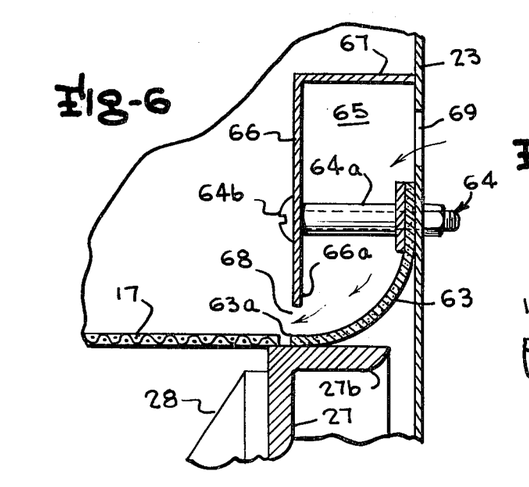
Figure 6A:
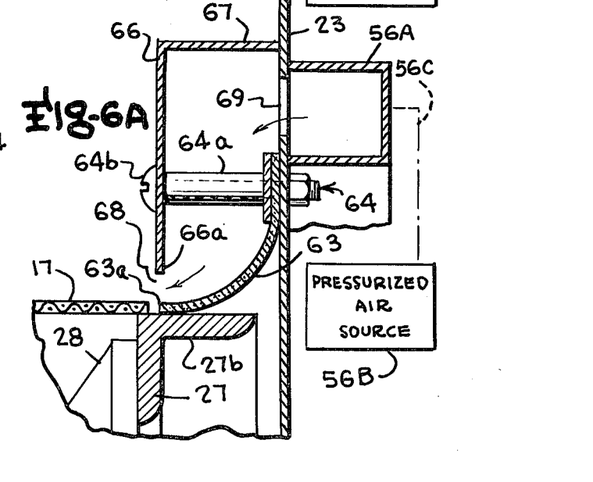

FIG. 6 is a view similar to FIG. 4, but showing another existing type of condenser construction modified to provide the air jet barrier means adjacent the ends of the condenser drum to prevent lint loss in that zone. In the form of FIG. 6, a flexible flashing strip of the conventional type, indicated at 63, is fastened in a circular path to the condenser end head 23 by the fastening lugs 64 located radially outwardly from the extended cylindrical path of the condensing screen 17 and providing sliding contact engagement at the free-edge portion 63a of the flashing strip 63 with the axially projecting flange 27b of the condenser drum end ring 27. An atmospheric air chamber, here indicated by the reference character 65, is formed radially outwardly of the path of the condenser drum end ring 27 by sheet material shaped to define an annular vertical side wall 66 and a cylindrical outwardly projecting top wall 67. The side wall portion 66 is rigidly held in inwardly spaced parallelism with the condenser end head 23 by a spacer 64a and the bolt portion 64b of the plurality of circumferentially spaced fastening lugs 64 which also hold the flashing strip 63 in place, while the cylindrical top wall member 67 extends from the side wall member 66 to the condenser end head 53 in tight abutment with the latter. The lower edge 66a of the side wall member 66 for the air chamber 65 defines an air barrier slot 68 immediately adjacent and radially outwardly of the free edge portion 63a of the flashing strip 63 and the condenser end head 23 is provided with atmospheric air inlet openings 69 in appropriate number and size to communicate the interior of the air chamber 65 with atmospheric air and maintain atmospheric air pressure conditions in the chamber 65. Thus, the pressure differential resulting from the subatmospheric pressure conditions in the condenser housing outwardly surrounding the screen 17 and the atmospheric pressure conditions maintained in the air chamber 65 produce air flow outwardly through the slot 68 which prevents lint from accumulating at or being captured by the flashing strip 63 or the pinch point between the flashing strip 63 and the drum end ring 27, thus preventing the undesirable accumulation of lint at this region.

Figure 7:
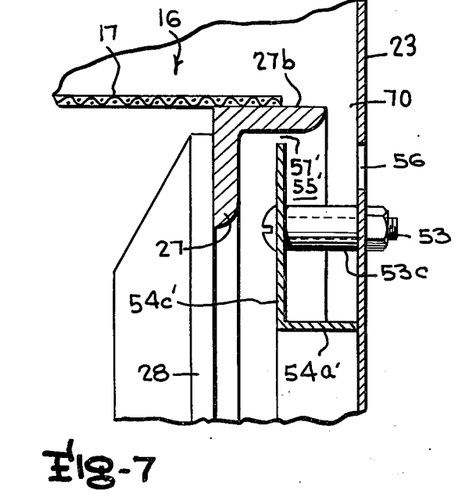
Figure 7A:
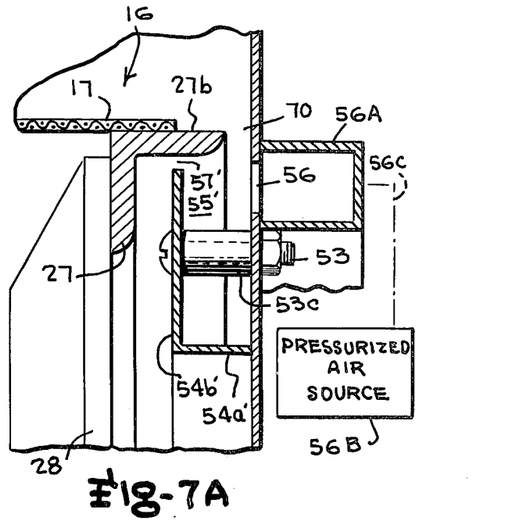

FIG. 7 illustrates another form of providing the air jet barrier means, for preventing loss of lint in new condensers, as distinguished from existing condensers, in the zone between the ends of the condenser drum 16 and the end heads 23 of the condenser housing. In the form shown in FIG. 7, the outwardly projecting cylindrical flange portion 27b of the end ring 27 extends closer to the adjacent condenser end head 23 than in the FIG. 4 form where the stationary ring 51 is provided, and an atmospheric air chamber 55' is provided inwardly adjacent the flange 27b of the drum end ring 27, defined by an annular vertical wall member 54c' spaced inwardly and held in parallelism with the condenser end head 23 by the spacer 53a of the plurality of fastening lugs 53 similar to the lugs of the FIG. 4 embodiment, together with a bottom wall 54a' extending in a cylindrical path concentric with the drum axis of rotation and butting against the inner surface of the condenser end wall 23. An air jet barrier outlet slot 70 is thus formed between the edge of the drum end ring flange 27b and the adjacent condenser end head 23 for flow of air outwardly through the slot 27 into the subatmospheric pressure zone of the condenser housing from the atmospheric pressure conditions in the air chamber 55' to prevent loss of lint through this space, and a small amount of air flow exits from the chamber 55' through the slot 57' defined between the upper edge of the vertical chamber wall 54c', as viewed in FIG. 7, and the flange 27b of the condense drum end ring 27.

Figures 8, 8A:
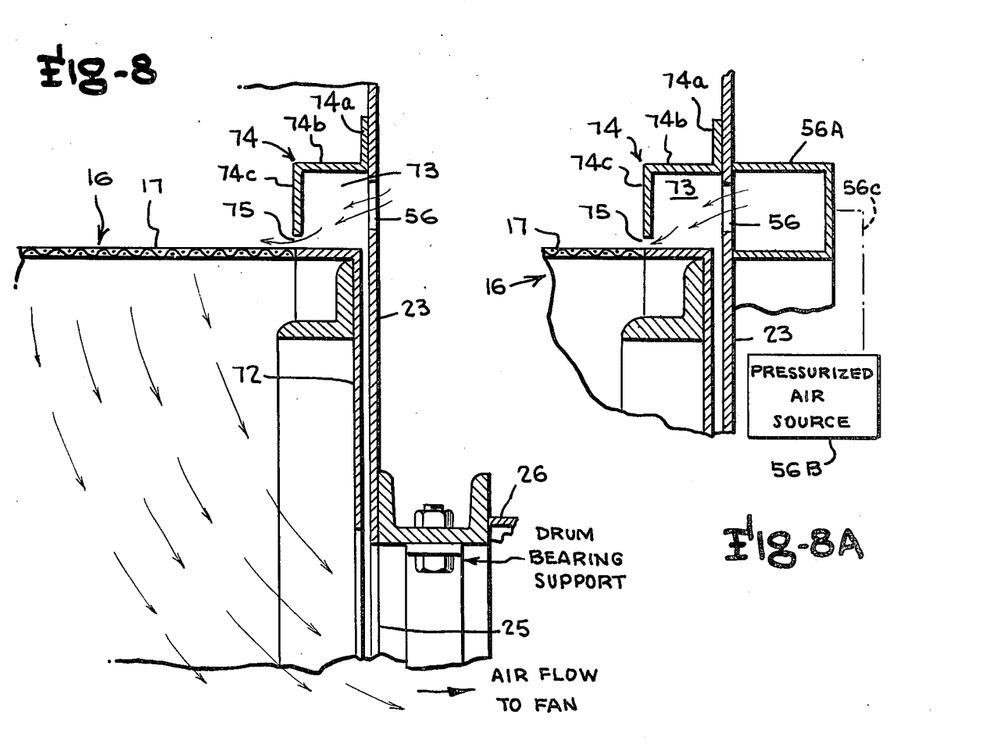

Yet another form is illustrated in FIG. 8, wherein a conventional existing condenser of the type formerly having a circular flexible flashing strip at each end of the drum mounted on each of the condenser end heads 23 radially outwardly of the adjacent end of the drum and curving toward the drum axis and toward the center of the condenser housing to bear against the end portion of the condenser is displaced by air jet barrier means of the present invention. In the form of FIG. 8, where the end of the condenser drum 16, indicated by the reference character 72, lies closely adjacent to the condenser end head 23, a circular air chamber 73 is formed in the zone formally occupied by the flashing strip by a circular wall or partition 74 of Z-shaped cross section providing a first vertical annular flange portion 74a fixed to the end head 23 of the condenser, a second cylindrical wall portion 74b extending inwardly of the condenser from the wall portion 74a along a cylindrical path concentric with and spaced radially outwardly from the surface of the condenser drum 16, and another vertical annular wall portion 74c extending radially inwardly from the cylindrical wall portion 74b and terminating a selected distance from but close to the surface of the condenser screen 17 at the adjacent end of the drum 16 to provide the air jet barrier slot 75 therebetween. Air inlet openings 56 are provided in the condenser end head 23, as in the previously described embodiments, in sufficient number and of sufficient size to maintain the pressure within the air chamber 73 substantially at atmospheric pressure or very near to atmospheric pressure and greater than the subatmospheric pressure conditions existing in the condenser housing outwardly of the drum 16 to cause air flow into the condenser chamber through the slot 75 with sufficient force to present a barrier to loss of lint through the slot 75 and into the space between the end of the condenser drum and the condenser end head 23.

FIGS. 4A to 8A inclusive illustrate variants of FIGS. 4 to 8 respectively, wherein a pressurized air manifold and a source of pressurized air are associated with the air inlet holes or openings 56 or 69 in the condenser end head 23 in the FIGS. 4 to 8 inclusive to produce adequate air inflow through the inlet openings and the air seal forming slot at the condenser drum periphery to provide an effective seal in cases where the subatmospheric pressure in the lint receiving zone or condensing chamber is not sufficiently low to induce enough air flow to form a sealing jet. As shown in FIGS. 4A to 8A, an air supply manifold or conduit 56A of any appropriate desired configuration communicates with the air inlet openings 56 or 69 in the condenser end head 23, for example by welding a ring shaped or annular channel to the exterior surface of the end head 23 to form the manifold 56A, and a source of pressurized air, indicated at 56B in FIGS. 4A to 8A, such as a motorized fan or blower, is connected by suitable ducting indicated diagrammatically at 56C to the manifold 56A to supply an appropriate quantity of pressurized air to the inlets 56 or 69. Otherwise, the structure of the condensers in FIGS. 4A to 8A is like the condensers in FIGS. 4 to 8 and corresponding components are indicated by the same reference characters as used in FIGS. 4 to 8.

In order to attain the above-stated goal of delivering cotton to the lint slide and baling press at a moisture level in the range of about 7% to 8%, so that the cotton will be at optimum condition for processing at the textile mill, a condenser lint humidifier system is associated with the condenser in accordance with the present invention to supply controlled high humidity air to the condenser in such manner as to permit this air to pass through the bat being formed on the condenser screen and pass through the screen ahead of the doffing rollers 31, 32. It has been recognized that lint cotton regains moisture very rapidly, and with about one pound of D.A. at approximately 125° F. to 130° F. dew point, it is possible to raise the lint moisture to the desired approximately 8% from a starting point as low as 3½%. Air which has a dew point of about 128° F. contains 0.1 pounds of water per pound of dry air (13.6 cu. ft.). In order to raise the lint moisture level by an additional 5% (0.05 pounds water per pound of lint), each pound of air (dry basis) would have to give up half of its moisture, which would drop its dew point to only about 105° F. This has therefore presented a very serious problem in trying to provide a system wherein air can release its moisture to the lint as it comes in contact with the cotton without having the air actually reach a dew point and wet the metal surfaces of the condenser drum which it contacts. Condensation of moisture on the condenser screen causing lint to stick to it and blind the screen has limited the moisture application to about 2 to 3% depending on ambient conditions.

It has been found that a good moisture transfer takes place when one pound of air per pound of lint is used. If lint is applied to the condensing screen at the rate of about 30 bales per hour (250 pounds per minute) then, about 250 × 13.6 C.F.M. is desirable, or 3400 C.F.M. of dry air. If the air containing one-tenth of a pound of water per pound of dry air gives up ½ its water (0.05 pounds of water per pound of dry air), then it is adding 0.05 pounds of water per pound of lint or 5%. When the temperature of the lint is above the dew point of the air, the rate of moisture transfer is greatly reduced, and since the exposure time in an average condenser is less than about ½ second, the potential percent of regain is greatly reduced.

The lint humidifier system of the present invention makes use of heater air passing through a dense spray of water which raises the dew point of the outgoing air to about that of water temperature. When 1.5 M B.T.U. of heat is applied to the 3400 C.F.M. air to be placed in moisture transfer relation to the lint, the temperature is raised about 400° F., or about 450° F. When water at the rate of 100 gallons per minute or more is applied to spray nozzles through which the heated air passes and the 450° F. air is passed through the spray, the water temperature is soon raised to about 128° F., which produces a dew point of about 128° F. Less heat produces a lower dew point, although the 450° F. air is about the maximum that can be conveniently handled through such a system, so air containing about 0.1 pounds of water per pound of dry air is about the maximum, without recirculating some of the air through the unit.

Referring particularly to FIG. 3 illustrating an example of a condenser lint humidifier system embodying the present invention, there is shown a vapor producing unit indicated generally by the reference character 80 in the form of a vertically elongated stack or tower type unit comprising a water tank 81 at the base of the unit, surmounted by a spray chamber 82 having a plurality of spray nozzles 83 supplied through a manifold from a modulating valve 84 and water pump 85 drawing water from the tank 81. Approximately one-third of the nozzles are supplied through a water line bypassing the modulating valve 84. Heated air is directed into the spray chamber 82 through a heater 86 having a screened intake 87 associated therewith for drawing in ambient air, heating the same and discharging it into the spray chamber 82. The heated air discharged into the spray chamber 82 picks up moisture from the spray chamber and rises through a safety screen 88, in the illustrated embodiment, and a chill spray chamber 89 having a spray nozzle 89a therein supplied with cold water, providing high humidity air to be drawn from the upper end of the vapor unit 80 through suitable duct work, indicated generally at 90, by a fan 91, and propelled to the moisture air inlet manifold 40 at the condenser. A temperature sensor T-1 is provided in the spray chamber 82, a temperature sensor T-2 is provided in the top region of the vapor unit 80, and a temperature sensor T-3 is provided at the moist air inlet manifold 40 at the condenser. A suitable starting switch activates the unit starting the heater 85 on low flame and the water pump 85 supplying the nozzles 83a. The heater control is made automatically responsive to the lint moisture level, for example, monitored by a resistance type lint moisture level measuring device of conventional design measuring the lint being discharged from the condenser. If and when the temperature at the T-3 sensor reaches a preset level, usually about 130°, the modulating valve 84 opens to maintain T-3 setting automatically. If the moisture level monitor continues to call for additional heater output to maintain the present lint moisture level, the full range of the modulating valve 84 may be used in an attempt to keep the temperature at T-3 at the present level. In this case if the T-3 temperature overruns the setting, the chill spray will be activated.

When a preset lint moisture level is reached, the heater control for the heater 86 is adjusted to reduce the heater input. As the temperature at sensor T-3 drops, the water pressure is reduced. If the lint moisture drops below a preset level, the sequence is repeated.

The desired goal, of course, is to maintain a humid air dew point which has sufficient water vapor which, when transferred to the lint, will produce the desired moisture level, and to maintain a temperature at sensor T-3 only slightly above the dew point, so that when the air contacts the lint the dew point is reached and the air transfers a desired amount of moisture to the lint. Preferably, the heated air from the heater 86 is introduced tangentially into a circular tube form of spray chamber 82, where the air spirals upwardly through a spray of water but maintains a relatively long contact with the water as it spirals in order to bring its dew point to the desired level without raising the dry bulb temperature above the desired level. The desirable dew point, of course, is that which will permit the air to hold sufficient water to transfer to the lint up to about 0.05 pounds of water per pound of lint. The desirable dry bulb temperature at the point of contact with the lint is that which will permit the transfer of the moisture to the lint. Various combinations of dew point and dry bulb temperature are possible, but a practical level which I have found useful is a 125° F. dew point and a 130° F. to 132° F. dry bulb temperature, or a relative humidity of about 85-90%.

This dew point temperature is maintained while the water spray volume is controlled by the modulating valve 84 so that the air leaving the unit and going directly to the condenser would always have a dry bulb temperature above the dew point. The latter requirement is accomplished in a preferred embodiment by arranging the spray nozzles in the vapor unit in three banks. As the temperature of the metal surfaces of the condenser and the duct work change due to changes in ambient conditions, additional nozzles are added or cut out under control of thermocouples at the condenser controlling solenoid valves on the water line to the nozzles.

The spiral or cyclonic action of the air in the vapor unit allows the air to leave the unit free of raw water without the use of troublesome eliminators commonly used in such units. This action also makes more efficient use of the heat in producing vapor, thus producing a higher humidity air. To avoid the dry bulb temperature becoming too high to allow sufficient moisture transfer to the lint under some ambient conditions, I pass the air through a light spray of water in the chill spray chamber 89 to reduce its temperature between the vapor unit and the condenser.

Figure 9A:
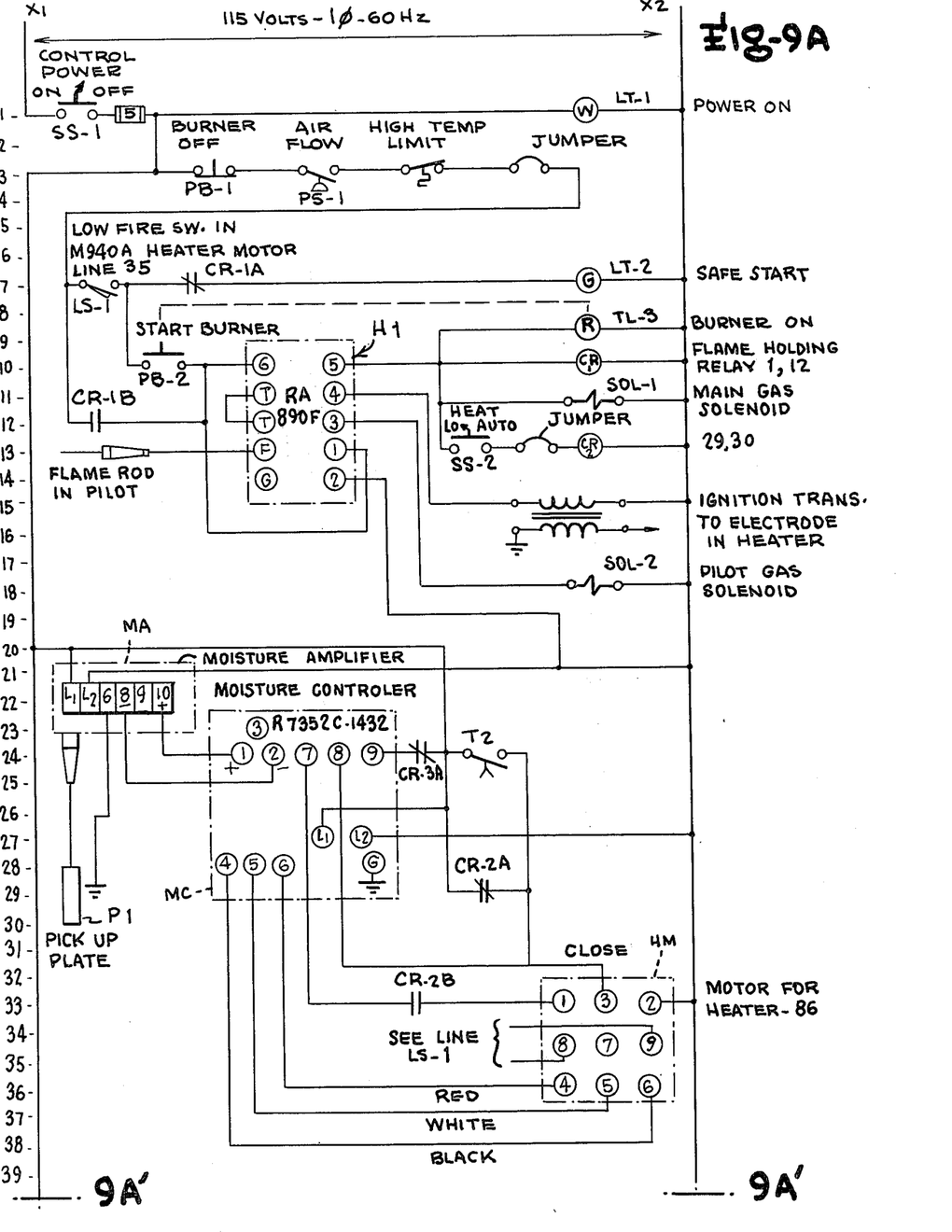
FIGS. 9A and 9A' collectively form an electrical ladder-type line diagram of an electrical control circuit that may be used for a humidifier or moisturizer system associated with the condenser.
Figure 9B:
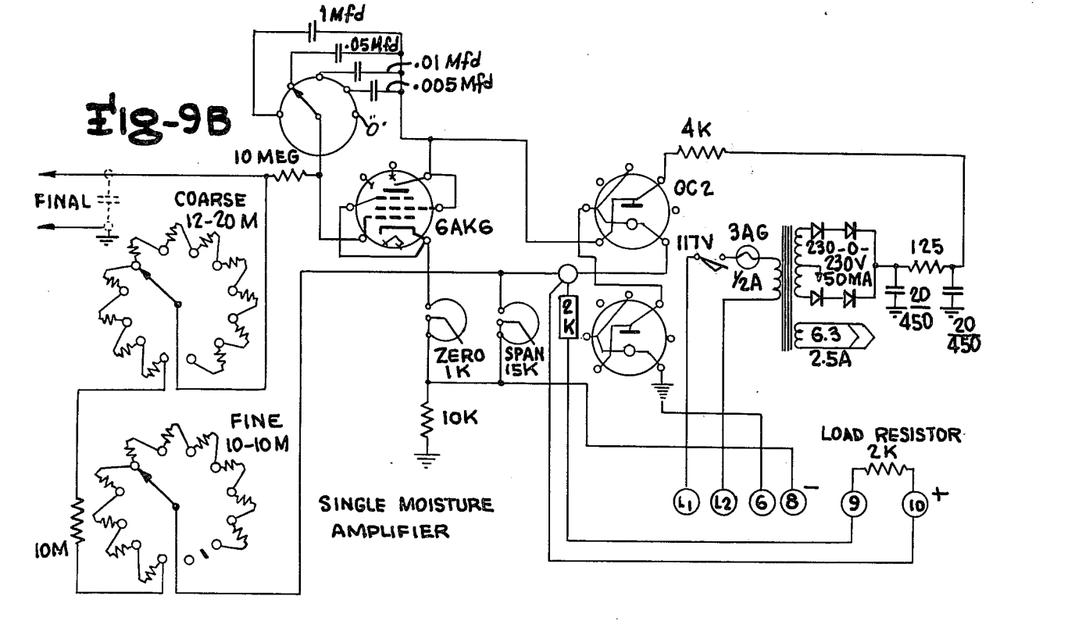
FIG. 9B shows a schematic diagram of a component thereof.
Figure 10:
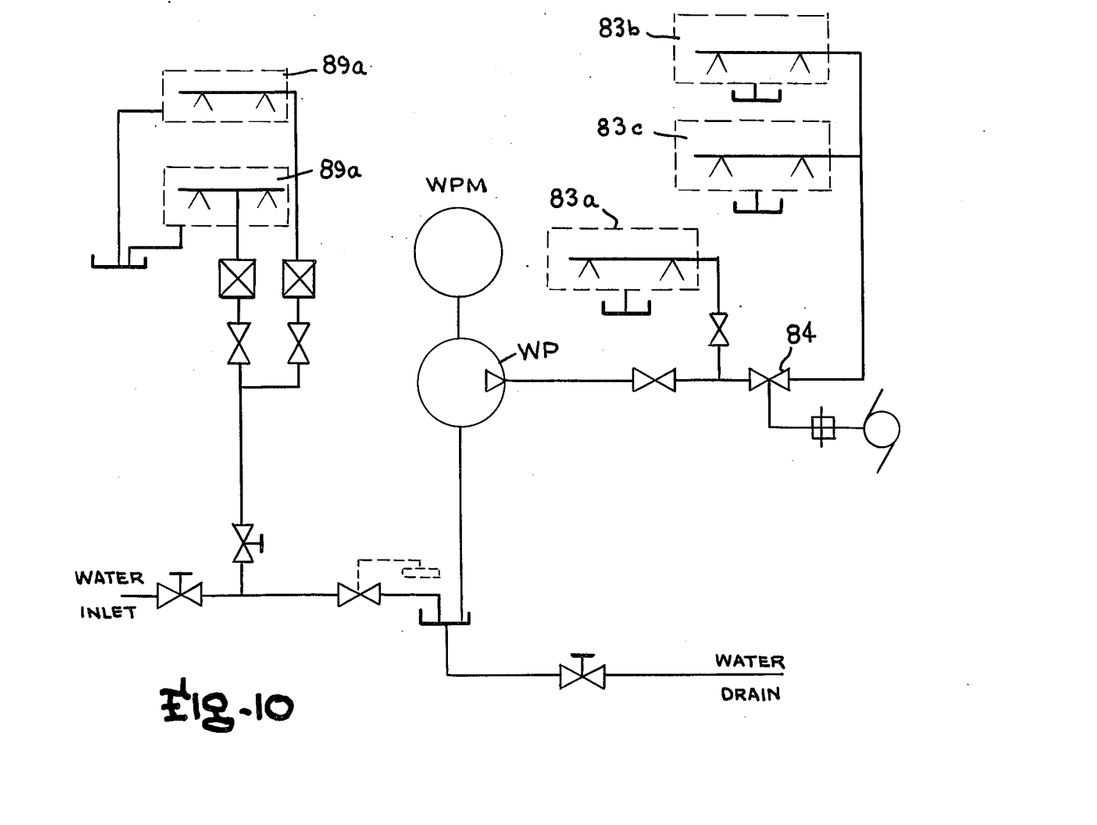
FIG. 10 is a schematic diagram of a water system that may be used therewith.

One satisfactory example of the electrical control circuit for the lint humidifier or moisturizer system which may be used to achieve proper lint moisture control is illustrated in the ladder or line type electrical schematic diagram of FIGS. 9A, 9B and the water system schematic diagram of FIG. 10. The humidifier or moisturizer system is designed to continuously monitor the moisture content of the lint cotton at the battery vapor condenser 15 and control the moist air input to attain the desired moisture content of the packaged bale. In the illustrated example, the lint humidifier or moisturizer is made up essentially of three sub-systems; a moisture detector control circuit sub-system, a temperature control circuit sub-system, and a chill water temperature control sub-system. The moisture detector control circuit sub-system serves to detect the moisture content of the cotton leaving the condenser 15 at a pick-up plate PU-1 of conventional form, located for example at the lint slide from the condenser 15 to the baling press, to increase the moisture if it is below a chosen set point. When the moisture reading derived from the pick-up plate is below the set point, a Moisture Controller unit, such as an R7352C-1432 Moisture Controller made by HONEYWELL, INC., of Minneapolis, Minn. increases the setting of the heater 86 to increase its BTU output, allowing for an increased vaporization volume which increases the moisture content of the cotton. The Temperature Control Circuit sub-system is to hold the moist air inlet temperature supplied to manifold 40° to 128° dew point with varying heater outlet temperatures caused by the Moisture Detector Circuit. As the moist air inlet temperature increases, this Temperature Control Circuit opens the water valve 84 holding the moist air temperature to 128° as a chosen temperature where fast moisture transfer is possible. The Chill Water Control Circuit sub-system is provided for those times when the Temperature Control Circuit sub-system cannot hold the desired 128° F., to assist in holding this temperature.

Referring now to the specific circuit shown in FIGS. 9A, 9A' and 9B, and in some cases to FIG. 10, electric power to the lint humidifier or moisturizer unit is through the OFF-ON Selector Switch SS-1 (Line 1) to fuse F1 (Line 1). White pilot light LT-1 (Line 1) indicates the power is ON. When Selector Switch SS-1 is ON, power is supplied to the Moisture Amplifier MA (Line 21), Moisture Controller MC (Line 22), Temperature Controller TC (Line 41) and Chill Water Controller CWC (Line 56). For example, the Mositure Amplifier MA may be a Model C-7701 moisture amplifier made by McCONNELL INDUSTRIES of Birmingham, Ala., the Moisture Controller may be an R7352C-1432 Moisture Controller made by HONEYWELL, INC., the Temperature Controller TC may be an R7352A Controller made by HONEYWELL, INC., and the Chill Water Controller CWC may be a model LFE#503K 0°–300° Controller made by API INSTRUMENT COMPANY, LFE Corporation, Waltham, Mass. (having as an example the schematic shown in FIG. 9B).

Current for the Heater 86 is supplied to Heater Control H-1, which may be an RA-890F Control made by HONEYWELL, INC., through Push Button PB-1 (Line 3), Air Flow Pressure Switch PS-1 (Line 3), High Temperature Limit Switch TS-1 (Line 3), Low Fire Limit Switch LS-1 (Line 7) and Start Burner Push Button PB-2 (Line 10). To start the Heater 86, the suction fan serving the condensor must be "on", proving Air Flow Pressure Switch PS-1 (Line 3) and the Heater Motor HM (Line 33), which may be a Honeywell M944G control, has to be in low fire position closing Low Fire Limit Switch LS-1 (Line 7). The "Safe Start" Pilot Light LT-2 (Line 7) will indicate above. Pressing the Start Burner Push Button PB-2 (Line 10) will energize the Flame Safety Relay RA-890F of Heater Control H-1 (Line 12) which in turn energizes the Ignition Transformer IT-1 (Line 15) and Pilot Gas Solenoid Sol-2 (Line 18). When the Pilot is proven to the Pilot Flame Rod (Line 13), the Flame Safety Relay RA-890F (Line 12) will de-energize the Ignition Transformer IT-1 (Line 15) and energize the Flame Holding Relay CR-1 (Line 10), the Main Gas Solenoid Sol-1 (Line 11) and Start Burner Pilot LT-3 (Line 9). When the Flame Holding Relay CR-1 (Line 10) is energized, contacts CR1A (Line 7) opens, de-energizing Safe Start Pilot Light LT-2 (Line 7) and contacts CR-1B (Line 12) close forming a holding circuit around Limit Switch LS-1 (Line 7) and Push Button PB-2 (Line 10).

At this time the Heater 86 is on and in low fire position preheating the system. The Low Fire Temperature is set by the Low Fire Regulator on the Heater and should be 128° F.

The temperature Controller TC-1 (Line 41) indicates the temperature at thermocouple T3 (Line 44) at all times. When the temperature at T3 is below the set point of 128° F. a Green indicator light in the face of the Temperature Controller TC-1 will be on and Contacts 9 to 7 (Line 43) will be closed. When the Green indicator light in on, Relay CR4 (Line 40) will be energized opening relay contacts CR4 (Line 60) preventing the Water Pump Motor WPM (Line 61) from starting if cotton is not present at the Pick-Up Plate PU-1 (Line 32) or the Water Valve 84 is fully closed, opening Limit Switch LS-4 (Line 61). When the temperature at T3 (Line 44) reaches the set point of 128° F., the Green indicator light of TC-1 will go off and Relay CR4 (Line 40) will be deenergized and Contacts CR4 (Line 60) will close, starting the Water Pump Motor WPM (Line 61).

Placing the "Lo-Heat- Auto" Selector Switch SS-2 (Line 13) to Auto position will energize Relay CR2 (Line 13). Contacts CR2A (Line 29) open, de-energizing the low fire close signal to terminal 3 of the Heater Motor HM (Line 33), and Contacts CR2B (Line 33) close connecting the Open signal to terminal 1 of Heater Motor HM (Line 33) into the circuit.

When cotton reaches the battery condensor 15, the Pick Up Plate PU-1 (Line 32) will be moved away from the "No Cotton" position allowing cotton Limit Switch LS-3 (Line 63) to open, deenergizing Relay CR3 (Line 64), and Timer T2 (Line 65). Contacts CR3A (Line 24) will close furnishing current to the control circuit of the Moisture Controller MC (Line 22). Contacts CR3B (Line 58) will close setting up the Chill Water Controller CWC (Line 56) when Limit Switch LS-2 (Line 58) is closed. Contacts CR3C (Line 61) close starting Water Pump Motor WPM (Line 61) if Limit Switch LS-4 (Line 61) is closed.

The Pick Up Plate PU-1 (Line 32) and the Moisture Amplifier MA (Line 21) measure the moisture content of the cotton that is passing and feeds the signal to the Moisture Controller MC (Line 22). If the signal is above the set point of 128°, no control action will take place. If the signal is below the set point of the Moisture Controller MC (Line 22) contacts 9 to 7 (Line 24) of the Controller MC will close and the Heater 86 will start to increase its BTU output. As the temperature at T3 (Line 44) increases above the set point (128° F. ) of the Temperature Controller TC-1 (Line 41), contacts 9 to 8 will close and the Water Valve WV will start opening and hold the temperature at T3 to 128° F.

The increased BTU output from Heater 86 will allow an increase in vaporization volume. The increase in vaporization will be absorbed by the cotton in the condenser raising the moisture content. The Heater 86 will continue to increase its BTU output until the moisture content of the cotton equals the set point of the Moisture Controller MC (Line 22). The Temperature Controller TC-1 (Line 41) will modulate the Water Valve WV (Line 43) holding the temperature at T3 (Line 44) to 128° F.

When the moisture content of the cotton reaches the set point of the Moisture Controller MC (Line 22) the Heater 86 will hold at that position until the moisture of the cotton changes or the gins are thrown out.

If the moisture content of the cotton increases above the set point, the contacts 9 to 8 (Line 24) of Moisture Controller MC (Line 22) will close reducing the BTU output of the Heater 86. This in turn will cause the temperature at T3 to decrease. When the Temperature at T3 goes below the set point of the Temperature Controller TC-1 (Line 41), contacts 9 to 7 (Line 43) close reducing the water flow and hold the temperature at T3 to 128° F. This reduced vaporized volume will lower the moisture content of the cotton to the set point of the Moisture Controller MC (Line 22).

As mentioned before, a condition might occur when the Temperature Controller TC-1 (Line 41) will not be able to hold the desired 128° F. at T3. When the Water Valve WV is 100% open, Limit Switch LS-2 (Line 58) is closed connecting the Chill Water Controller CWC into the circuit. At 132° F., contacts 10 to 12 (Line 58) close energizing Solenoid Sol 3 (Line 56) and Timer T1 (Line 57). In the embodiment, there are a first stage chill spray and a second stage chill spray controlled by solenoids to spray water into chamber 89. Solenoid Sol 3 (Line 56) is the first stage chill water and should reduce temperature to 128° F. At an adjustable time delay by Timer T1, contacts (Line 58) will close energizing Solenoid Sol 2 (Line 58) providing second stage chill water. The first stage chill water usually lowers the temperature of T3 to 128° F. If not, the second stage energizing will reduce the temperature of T3 to 128° F. When the T3 temperature goes below 128° F., the Chill Water Spray will be de-energized.

When cotton stops coming to the battery condenser, the Pick Up Plate PU-1 will move to the "No Cotton" position closing Limit Switch LS-2 (Line 64) energizing Relay CR3 (Line 64) and Timer T2 (Line 65). Contacts CR3A (Line 24) open, disconnecting power to control contacts of Moisture Controller MC (Line 22) preventing Heater 86 from increasing or decreasing its BTU output at this time. Contacts CR3B (Line 58) open disconnecting power to Chill Water Controller CWC (Line 56) preventing either stage of chill water from being energized. Contacts CR3C (Line 61) open setting up circuit to stop water pump (Line 61) when system cools down.

When Timer contacts T2 (LINE 24) close, the Heater Motor HM (Line 33) will start to close, decreasing the BTU output. As T3 temperature (Line 44) decreases below the set point the Temperature Controller TC-1 (Line 41) will close contacts 9 to 7 (Line 43) which starts the Water Valve WV (Line 43) closing and energizes Relay CR4 (Line 40). Contacts CR4A (Line 60) open, stopping the water pump. When the temperature at T3 increases above the set point due to the absence of water, contact 9 to 7 will open deenergizing Relay CR4 (Line 40) closing contacts CR4A (Line 60) starting Water Pump WPM (Line 61), preventing T3 Temperature (Line 44) from exceeding 128° F. This cycling will continue until the Heater 86 is in the Low Fire Position.

Referring now to FIG. 10, it will be seen that the water for the nozzles 83 for the spray chamber 82 and for the nozzles 89a of the chill spray chamber 89 is supplied through gate valve 12-V1 and float valve 12-V2. A tank 12-T is filled to a preset level which is set by float valve 12-V2 and replenishes the water that is vaporized.

When the Water Pump Motor WPM (Line 61) is energized, the Water Pump WP supplies water from the Tank 12-T to four primary nozzles 83a which are mounted to a top ring and are sprayed down against the air flow in the spray chamber 82. As the requirements are increased by the Moisture Controller MC (Line 22) the BTU output of the Heater 86 is increased and Temperature T3 (Line 44) will increase above the set point of the Temperature Controller TC-1 (Line 41). The Water Valve Motor WVM (Line 43) will start to open the Water Valve 84 supplying water to two rings of six nozzles each indicated at 83b and 83c. The top ring of nozzles 83b are spraying down and the bottom ring of nozzles 83c are spraying up. The Water Valve 84 will continue to open increasing the supply of water to the nozzle 83b, 83c until Temperature T3 (Line 44) is reduced to the set point of the Temperature Controller TC-1 (Line 41).

The Chill Water Circuit is activated only when Water valve 84 is full open and Temperature T3 (Line 44) exceed 132° F. The first stage chill water is controlled by Solenoid Sol 3 (FIG. 10 and Line 56), and the second stage chill water is controlled by Solenoid Sol 4 (FIG. 10 and Line 58). It will be observed from the schematic that the chill water circuit is supplied with fresh water through gate valve 12-V1, since the water that is being circulated by the pump WP will over a period of time approach 128° F. and can not hold Temperature T3 (Line 44) to 128° F. with high BTU input by the Heater 86. As Temperature T3 (Line 44) increases above 128° F. the percentage of relative humidity decreases; for example, when Temperature T3 is 130° F. the percentage relative humidity is 90%, and when T3 is 135° F. the percentage relative humidity is 80%. This reduction in percentage relative humidity reduces the ability to transfer moisture to the cotton.

What is claimed is:

1. A lint condenser and lint humidifier system for receiving air borne lint cotton or the like from an air stream, separating the lint from the air stream to form a bat for delivery through a discharge outlet, and concurrently increasing the moisture level of the lint, comprising a condenser housing and a rotatable screen drum therein have a screen surface on which the lint bat is to be formed, the housing forming a lint inlet and condensing chamber outwardly surrounding the screen surface over a predetermined inlet zone for receiving the air borne lint deposited as a bat on the screen drum surface, means maintaining the interior of the housing and said chamber at subatmospheric pressure, a doffing station having a first pair of doffing rollers adjacent the screen surface at a location to doff the bat from said screen surface for delivery through said discharge outlet to an external processing station at ambient pressure and a second pair of rollers inwardly adjacent the discharge outlet for passage of the bat therethrough and serving as a seal against air inflow at the discharge outlet and maintaining the pressure differential between the subatmospheric pressure in the housing and external atmospheric pressure, sensor means for monitorng the moisture level of the lint bat being delivered through the discharge outlet, a humidifying air supply duct system having a humidifying air outlet opening through said housing into said chamber, and air humidifying means having means for adding moisture to air supplied through said duct system to said air outlet responsive to the moisture levels monitored by said sensor means including automatic control circuitry coupled to the sensor means and humidifying means to raise and maintain the moisture level of the delivered lint at a predetermined value.

2. A lint condenser and lint humidifier system as defined in claim 1, wherein said air supply duct system includes a supply duct extending to a location adjacent the condenser housing and communicating through said humidifying air outlet with said chamber at a humidifying air supply zone above and adjacent said doffing station.

3. A lint condenser and lint humidifier system as defined in claim 1, wherein said air supply duct system includes a supply duct extending to a location adjacent the condenser housing and communicating through said humidifying air outlet with said chamber at a humidifying air supply zone above and adjacent said doffing station, said humidifying air outlet being shaped and directed to cause humidified air from said air supply duct system to be directed from said air outlet inwardly from the housing wall toward and substantially normal to the screen drum surface to pass through the lint bat thereon and the screen drum surface to the drum interior shortly ahead of the doffing station.

4. A lint condenser and lint humidifier system as defined in claim 2, including bat form preserving rollers located adjacent to and above and below the location where said humidifying air outlet enters the housing to press the bat against the screen drum surface immediately above and below the humidifying air supply zone and thereby preserve the form of the bat against disrupting forces from the velocity of the entering humidifying air.

5. A lint condenser and lint humidifier system as defined in claim 3, including bat form preserving rollers located adjacent to and above and below the location where said humidifying air outlet enters the housing to press the bat against the screen drum surface immediately above and below the humidifying air supply zone and thereby preserve the form of the bat against disrupting forces from the velocity of the entering humidifying air.

6. A lint condenser and lint humidifier as defined in claim 1, wherein said condenser housing includes wall portions defining a downward inclined excursion adjacent said doffing station forming a surround about said pair of rollers and the path of the bat from said doffing rollers to said discharge outlet, flexible sealing strips extending from said wall portions in wiping sealing contact with the bat engaging surfaces of the second pair of rollers and the latter being supported for relative movement toward and away from each other to pass the bat therebetween and biased toward each other to maintain air sealing contact with the bat therebetween or with each other in the absence of a bat therebetween.

7. A lint condenser and lint humidifier as defined in claim 3, wherein said condenser housing includes wall portions defining a downward inclined excursion adjacent said doffing station forming a surround about said pair of rollers and the path of the bat from said doffing rollers to said discharge outlet, flexible sealing strips extending from said wall portions in wiping sealing contact with the bat engaging surfaces of the second pair of rollers and the latter being supported for relative movement toward and away from each other to pass the bat therebetween and biased toward each other to maintain air sealing contact with the bat therebetween or with each other in the absence of a bat therebetween.

8. A lint condenser and lint humidifier as defined in claim 4, wherein said condenser housing includes wall portions defining a downward inclined excursion adjacent said doffing station forming a surround about said pairing of rollers and the path of the bat from said doffing rollers to said discharge outlet, flexible sealing strips extending from said wall portions in wiping sealing contact with the bat engaging surfaces of the second pair of rollers and the latter being supported for relative movement toward and away from each other to pass the bat therebetween and biased toward each other to maintain air sealing contact with the bat therebetween or with each other in the absence of a bat therebetween.

9. A lint condenser and lint humidifier as defined in claim 5, wherein said condenser housing includes wall portions defining a downward inclined excursion adjacent said doffing station forming a surround about said pairing of rollers and the path of the bat from said doffing rollers to said discharge outlet, flexible sealing strips extending from said wall portions in wiping sealing contact with the bat engaging surfaces of the second pair of rollers and the latter being supported for relative movement toward and away from each other to pass the bat therebetween and biased toward each other to maintain air sealing contact with the bat therebetween or with each other in the absence of a bat therebetween.

10. A lint condenser and lint humidifier system as defined in claim 1, wherein one of said doffing rollers at the downstream side of the doffed bat path relative to the screen drum is a wiper roller provided with a plurality of flexible vane members extending generally radially of the doffing roller to have wiping contact with the screen surface during rotation of the wiper roller to wipe the screen surface free of any moisture condensate formed thereon from the humidifying air supplied to the condenser tending to cause lint to adhere to the screen surface.

11. A lint condenser and lint humidifier system as defined in claim 3, wherein one of said doffing rollers at the downstream side of the doffed bat path relative to the screen drum is a wiper roller provided with a plurality of flexible vane members extending generally radially of the doffing roller to have wiping contact with the screen surface during rotation of the wiper roller to wipe the screen surface free of any moisture condensate formed thereon from the humidifying air supplied to the condenser tending to cause lint to adhere to the screen surface.

12. A lint condenser and lint humidifier system as defined in claim 4, wherein one of said doffing rollers at the downstream side of the doffed bat path relative to the screen drum is a wiper roller provided with a plurality of flexible vane members extending generally radially of the doffing roller to have wiping contact with the screen surface during rotation of the wiper roller to wipe the screen surface free of any moisture condensate formed thereon from the humidifying air supplied to the condenser tending to cause lint to adhere to the screen surface.

13. A lint condenser and lint humidifier system as defined in claim 5, wherein one of said doffing rollers at the downstream side of the doffed bat path relative to the screen drum is a wiper roller provided with a plurality of flexible vane members extending generally radially of the doffing roller to have wiping contact with the screen surface during the rotation of the wiper roller to wipe the screen surface free of any moisture condensate formed thereon form the humidifying air supplied to the condenser tending to cause lint to adhere to the screen surface.

14. A lint condenser and lint humidifier system as defined in claim 6, wherein one of said doffing rollers at the downstream side of the doffed bat path relative to the screen drum is a wiper roller provided with a plurality of flexible vane members extending generally radially of the doffing roller to have wiping contact with the screen surface during rotation of the wiper roller to wipe the screen surface free of any moisture condensate formed thereon from the humidifying air supplied to the condenser tending to cause lint to adhere to the screen surface.

15. A lint condenser and lint humidifier system as defined in claim 9, wherein one of said doffing rollers at the the downstream side of the doffed bat path relative to the screen drum is a wiper roller provided with a plurality of flexible vane members extending generally radially of the doffing roller to have wiping contact with the screen surface during rotation of the wiper roller to wipe the screen surface free of any moisture condensate formed thereon from the humidifying air supplied to the condenser tending to cause lint to adhere to the screen surface.

16. A lint condenser and lint humidifier system as defined in claim 1, wherein said air humidifier means comprises an air heating and humidifying apparatus including an air treating chamber having an array of water spray nozzles for rapidly increasing the moisture content of heated air passing therethrough and an air heater having a heater control therefor communicating with an air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

17. A lint condenser and lint humidifier system as defined in claim 3, wherein said air humidifier means comprises an air heating and humidifying apparatus including an air treating chamber having an array of water spray nozzles for rapidly increasing the moisture content of heated air passing therethrough and an air heater having a heater control therefor communicating with an air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

18. A lint condenser and lint humidifier system as defined in claim 4, wherein said air humidifier means comprises an air heating and humidifying apparatus including an air treating chamber having an array of water spray nozzles for rapidly increasing the moisture content of heated air passing therethrough and an air heater having a heater control therefor communicating with a air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

19. A lint condenser and lint humidifier system as defined in claim 5, wherein said air humidifier means comprises an air heating and humidifying apparatus including an air treating chamber having an array of water spray nozzles for rapidly increasing the moisture content of heated air passing therethrough and an air heater having a heater control therefor communicating with an air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

20. A lint condenser and lint humidifier system as defined in claim 6, wherein said air humidifier means comprises an air heating and humidifying apparatus including an air treating chamber having an array of water spray nozzles for rapidly increasing the moisture content of heated air passing therethrough and an air heater having a heater control therefor communicating with an air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

21. A lint condenser and lint humidifier system as defined in claim 9, wherein said air humidifier means comprises an air heating and humidifying apparatus including an air treating chamber having an array of water spray nozzles for rapidly increasing the moisture content of heated air passing therethrough and an air heater having a heater control therefor communicating with an air intake portion of said treating chamber to supply heated air thereto, a modulating water valve for regulating water supply to said spray nozzles, and said automatic control circuitry including means coupled to said heater control and said modulating valve for regulating the heating of air supplied to said air intake and the moisture imparted to the heated air in said treating chamber by said spray nozzles responsive to temperatures sensed at said treating chamber and within the condenser housing adjacent said air outlet and responsive to moisture levels sensed by said sensor means to automatically maintain the delivered bat at a predetermined moisture level.

22. A lint condenser and lint humidifier system as defined in claim 16, wherein said air heating and humidifying apparatus is in the form of a vertically elongated tower having said air treating chamber and said array of water spray nozzles in the lower portion of said tower and said air heater including air propelling and heating means within an air communicating duct for heating ambient air and supplying the same to said treating chamber, and said tower further including a chill spray chamber above said treating chamber having spray nozzle means therein supplied with cold water activated when the temperature monitored in the condenser housing overruns the predetermined setting therefor for maintaining moist air supply to said air outlet at a desired temperature.

23. A lint condenser and lint humidifier system as defined in claim 19, wherein said air heating and humidifying apparatus is in the form of a vertically elongated tower having said air treating chamber and said array of water spray nozzles in the lower portion of said tower and said air heater including air propelling and heating means within an air communicating duct for heating ambient air and supplying the same to said treating chamber, and said tower further including a chill spray chamber above said treating chamber having spray nozzle means therein supplied with cold water activated when the temperature monitored in the condenser housing overruns the predetermined setting therefor for maintaining moist air supply to said air outlet at a desired temperature.

24. A lint condenser and lint humidifier system as defined in claim 20, wherein said air heating and humidifying apparatus is in the form of a vertically elongated tower having said air treating chamber and said array of water spray nozzles in the lower portion of said tower and said air heater including air propelling and heating means within an air communication duct for heating ambient air and supplying the same to said treating chamber, and said tower further including a chill spray chamber above said treating chamber having spray nozzle means therein supplied with cold water activated when the temperature monitored in the condenser housing overruns the predetermined setting therefor for maintaining moist air supplied to said air outlet at a desired temperature.

25. A lint condenser and humidifier system as defined in claim 1, wherein said rotatable screen drum includes opposite drum end portions having circular peripheries located adjacent opposite sides of the condenser housing, the condenser housing having vertical side walls forming said opposite sides of the housing positioned close to said drum end portions defining narrow end spaces therebetween having circular entrances thereto along said circular peripheries heretofore customarily sealed by flexible flashing strips against lint loss inwardly through the entrances, air jet barrier means adjacent said circular peripheries of said opposite end portions including baffle wall means defining a generally annular barrier air chamber on said side walls immediately adjacent each of said opposite end portions conforming substantially to the circular paths of said circular peripheries having air supplied thereto to maintain air pressure therein superior to the subatmospheric pressure in said condensing chamber and having discharge jet forming outlet openings discharging barrier air jets in a ring-like pattern along said circular peripheries at the end portions of the screen drum in directions to provide air barriers sealing said entrances against loss of lint inwardly from the condensing chamber into said end spaces without flashing strips.

26. A lint condenser and humidifier system as defined in claim 25, wherein said air barrier chamber is an annular chamber extending in a circular path in radially inwardly adjacent concentric relation to the circular periphery of the adjacent drum end portion and said discharge jet forming outlet openings are formed to direct the barrier air jets generally radially of the screen drum outwardly through said entrances.

27. A lint condenser and humidifier system as defined in claim 25, wherein said air barrier chamber is an annular chamber extending in a circular path in radially outwardly adjacent concentric relation to the circular periphery of the adjacent drum end portion and said discharge jet forming outlet openings are formed to direct the barrier air jets generally axially of the screen drum directed along said screen surface toward the midregion of the drum at locations spaced slightly toward said midregion from said entrances.

28. A lint condenser and humidifier system as defined in claim 26, wherein said side walls have atmospheric air inlet openings communicating with the interior of said air barrier chamber for maintaining atmospheric air pressure in said annular chamber superior to the subatmospheric pressure in said condensing chamber.

29. A lint condenser and humidifier system as defined in claim 26, including a pressurized air source and means for supplying pressurized air from said source to the interior of said air barrier chamber for maintaining air pressure therein superior to the subatmospheric pressure in said condensing chamber.

30. A lint condenser and humidifier system as defined in claim 27, including a pressurized air source and means for supplying pressurized air from said source to the interior of said air barrier chamber for maintaining air pressure therein superior to the subatmospheric pressure in said condensing chamber.

31. A lint condenser for use in processing system for lint cotton or the like for receiving air borne lint from a lint conveying air stream, separating the lint from the air stream to form a bat, and delivering the bat through a discharge outlet for further processing, comprising a condenser housing including a pair of transversely spaced vertical side walls forming opposite end heads of the condenser, a cylindrical screen drum supported for rotation about a horizontal axis in the housing to substantially span the full width of the condenser housing, said housing forming a lint condensing chamber outwardly surrounding the screen drum surface maintained at subatmospheric pressure wherein the air borne lint is received and deposited as a bat on the screen drum surface, the screen drum having a cylindrical screen fixed at its opposite ends on a pair of end rings having circular peripheries disposed closely adjacent to said vertical side walls leaving end-bounding spaces therebetween to be protected against loss of lint from the condensing chamber therethrough, and air jet barrier means forming air barrier seals against lint admission to said spaces adjacent said circular peripheries at the ends of the screen drum including baffle wall means on said vertical side walls adjacent said circular peripheries forming annular barrier-air chambers supplied with air inflow from outside the condenser housing to maintain interior air pressure superior to the subatmospheric pressure in said condensing chamber and having air discharge outlets directing barrier air in a ring-like pattern along entrances to said spaces adjacent said circular peripheries at the ends of the screen drum in directions to effectively seal the entrances by outflowing air barriers against lint loss through said end-bounding spaces.

32. A lint condenser as defined in claim 31, wherein each said barrier air chamber is a continuous chamber extending in a circular path in radially inwardly adjacent concentric relation respectively to said circular peripheries of the opposite drum ends and said air discharge outlets are formed to direct the barrier air as jets extending generally radially of the screen drum outwardly through said entrances.

33. A lint condenser as defined in claim 31, wherein each said barrier air chamber is a continuous annular chamber extending in a circular path in radially outwardly adjacent concentric relation respectively to said circular peripheries of the opposite drum ends and said air discharge outlets are formed to direct the barrier air as jets extending generally axially of the screen drum directed along the surface of said screen toward the midregion of the drum at locations spaced slightly toward said midregion from said entrances.

34. A lint condenser as defined in claim 32, wherein said side walls have atmospheric air inlet openings communicating with the interior of said air barrier chamber for maintaining atmospheric air pressure in said annular chamber superior to the subatmospheric pressure in said condensing chamber.

35. A lint condenser as defined in claim 32, including a pressurized air source and means for supplying pressurized air from said source to the interior of said air barrier chamber for maintaining air pressure therein superior to the subatmospheric pressure in said condensing chamber.

* * * * *